United States Patent [19]

Szigethy

[11] Patent Number: 5,350,190

[45] Date of Patent: Sep. 27, 1994

[54] AIR BAG ASSEMBLY MOUNT INCLUDING SNAP-FIT HORN ATTACHMENT

[75] Inventor: Attila Szigethy, Rocky River, Ohio

[73] Assignee: Primrose, Inc., Cleveland, Ohio

[21] Appl. No.: 87,651

[22] Filed: Jul. 6, 1993

[51] Int. Cl.$^5$ .................. B60R 21/20; H01H 9/00
[52] U.S. Cl. .................. 280/728 A; 280/731; 200/61.55
[58] Field of Search ............. 280/728 A, 731, 743 R, 280/728 R; 200/61.54, 61.55, 61.56, 61.57

[56] References Cited

U.S. PATENT DOCUMENTS

| | | |
|---|---|---|
| 1,768,513 | 6/1930 | Denyes . |
| 3,712,968 | 1/1973 | Bonn et al. ................ 200/61.56 |
| 4,374,310 | 2/1983 | Kato et al. ................ 200/61.54 |
| 4,447,684 | 5/1984 | Sugiyama ................ 200/61.55 |
| 4,785,144 | 11/1988 | Fosnaugh et al. ................ 200/61.55 |
| 4,789,763 | 12/1988 | Nagata et al. ................ 200/61.54 |
| 4,789,765 | 12/1988 | Berg ................ 200/245 |
| 4,808,776 | 2/1989 | Niwa et al. ................ 200/61.55 |
| 4,872,364 | 10/1989 | Kaga et al. ................ 200/61.55 |
| 4,938,503 | 7/1990 | Muraoka et al. ................ 280/731 |
| 4,990,727 | 2/1991 | Ohno et al. ................ 200/61.54 |
| 5,001,311 | 3/1991 | Sakane ................ 200/61.54 |
| 5,239,147 | 8/1993 | Allard et al. ................ 200/61.54 |

Primary Examiner—Mitchell J. Hill
Assistant Examiner—Peter English
Attorney, Agent, or Firm—Pearne, Gordon, McCoy & Granger

[57] ABSTRACT

A connector for an air bag module or assembly which removably mounts the module to a mounting plate provided by a steering wheel or other support structure. A first embodiment of the connector movably mounts the module to the steering wheel, and provides a horn actuation feature. The module is biased to a normal position wherein a first horn switch contact provided by the steering wheel is spaced from a second horn switch contact provided by the module. The bias is overcome by user-applied force which moves the module inwardly relative to the steering wheel and thereby brings the first and second contacts into engagement and actuates the horn. The connectors of the first embodiment include first and second telescopingly related members and a biasing spring which tends to maintain the second member projecting from the first member. The second member includes a series of spaced-apart resilient arms which cooperate to provide a discontinuous annular or circumferential groove which receives a mounting plate provided by the steering wheel. The arms are radially deformable to disconnect the module from the steering wheel.

17 Claims, 4 Drawing Sheets

AIR BAG ASSEMBLY MOUNT INCLUDING SNAP-FIT HORN ATTACHMENT

BACKGROUND OF THE INVENTION

1. Field of the Invention

The present invention generally pertains to an air bag assembly and, more particularly, to connectors for removably mounting an air bag assembly.

2. Description of the Related Art

Air bag assemblies have been developed to be modular in design to speed installation of the assembly within a vehicle. Air bag assemblies or modules typically include an inflator, an inflatable air bag or cushion, and a cover member. The cover member is separable to allow the cushion to escape therethrough during inflation. The entire assembly or module is typically immovably bolted in place. Although bolting satisfactorily attaches the air bag assembly to the underlying support structure, it takes a considerable amount of time during assembly, and renders the mounted assembly difficult to un-attach and remove. Therefore, there exists a need in the art for an improved connector to rigidly but removably mount an air bag assembly within a vehicle.

Rigidly or immovably mounting the modular air bag assembly is acceptable in most applications. However, in driver's-side air bag assemblies, the cover member of the module occupies the center portion of the steering wheel, and thereby displaces the horn actuator mechanism from its traditional center position on the steering wheel. Separate, relatively small buttons or pads spaced from the center of the steering wheel are added to provide the horn actuation feature.

Naturally, it is desirable for the driver to sound the horn as quickly as possible. However, since the horn actuator pads are relatively small and displaced from the center of the steering wheel, it takes time for the driver to locate the pads, and renders the horn actuators used on these steering wheels somewhat less desirable and effective than those provided by prior steering wheels. Therefore, some consumers may perceive that cars having steering wheels which incorporate rigidly or immovably mounted air bags are less desirable, at least in this respect, than cars which do not incorporate such air bags into the steering wheel.

In response to the limitations of the fixedly-mounted air bag modules and small horn actuation pads discussed above, it has been proposed to mount the air bag module such that it is movable relative to the steering wheel. Movably mounting the air bag module allows it to incorporate a horn-actuation feature and thereby return the horn actuator to its customary and appropriate location in the center of the steering wheel.

Although this method of mounting the air bag module eliminates the problems associated with horn actuator placement, the mounting connectors currently used to movably mount the module to the steering wheel are of the ball-detente type, and are expensive and difficult to manufacture. As such, the problems associated with the known connectors for movably mounting the modules actually encourage manufacturers to continue to fixedly or immovably mount the air bag modules to the steering wheel.

Hence, there exists a need in the art for a simple and inexpensive mounting connector which removably attaches the air bag module to the steering wheel and allows the module to move relative to the steering wheel.

SUMMARY OF THE INVENTION

The present invention provides an improved air bag assembly mounting connector. A first embodiment of the present invention is directed toward a mounting connector for an air bag module which allows the module to move relatively toward and away from a steering wheel of an automobile. The connector removably attaches the air bag module to the steering wheel and cooperates with a mounting plate provided by the steering wheel to define a horn switch. A second embodiment of the present invention is directed toward a mounting connector which rigidly but removably attaches the air bag module to a mounting plate.

In accordance with the first embodiment of the present invention, a steering wheel including an air bag module assembly is provided. The module assembly includes a cover member, an inflator operable to inflate a cushion, a base plate, means for attaching the cushion to the base plate, and a series of mounting connectors for removably attaching the module to a mounting plate provided by the steering wheel. The cover member, which is separable upon inflation of the inflatable cushion to permit the cushion to escape or project therefrom, overlies the inflatable cushion and the base plate and defines an exterior center portion of the steering wheel. The inflator attaches to the base plate and extends through the base plate and into the inflatable cushion.

In further accordance with the first embodiment of the present invention, the mounting connectors have first and second members and means for biasing the first and second members relatively away from each other. The first member telescopingly receives the second member and includes means for retaining at least some of the second member therewithin. The first member has a distal end which attaches the mounting connector to the base plate. The second member includes a series of resiliently deformable arms which extend away from the first member and removably attach to the mounting plate.

In further accordance with the first embodiment of the present invention, the mounting plate defines a first horn switch contact and the first member defines a second horn switch contact. The biasing means normally maintains the first and second contacts relatively away from each other. The biasing means can be overcome by inward force upon the cover member above a predetermined threshold, causing the first member to engage the mounting plate and thereby actuate the horn.

The mounting connectors according to the first embodiment snap-fit the air bag module to the mounting plate, which eases and speeds assembly of the steering wheel, while allowing the center portion of the steering wheel to provide a horn-actuating function as was customary prior to the development of air bags. The connectors are removably mounted or attached to the mounting plate, and thereby allow the air bag module to be removed or withdrawn from the steering wheel for maintenance and service.

In accordance with a second embodiment of the present invention a mounting connector for rigidly but removably attaching an air bag module assembly to a mounting plate is provided. The mounting connector is designed to attach the module to a steering wheel, dashboard, seat back, head rest, or any other location in a passenger compartment for an automobile, air plane, truck, boat, bus or the like where an air bag-type passive occupant restraint is desired.

In further accordance with the second embodiment of the present invention, the mounting connector includes an enlarged head and a series of resiliently deformable arms. Each of the arms have an enlarged retaining distal portion and a proximal mounting portion. The retaining portion removably attaches the module to a mounting plate while the mounting portion attaches the connector to a base plate provided by the module.

In further accordance with the second embodiment of the present invention, the mounting portion provides upper and lower co-axial cylindrical surfaces adjacent a shoulder surface provided by the enlarged head. The upper cylindrical surface is adjacent the retaining portion of the arm. An interference fit between the lower cylindrical surface and the base plate retains the connector on the module.

BRIEF DESCRIPTION OF THE DRAWING FIGURES

These and further features of the present invention will be apparent with reference to the following description and drawings, wherein.

DETAILED DESCRIPTION OF THE PREFERRED EMBODIMENTS

Figure 1:
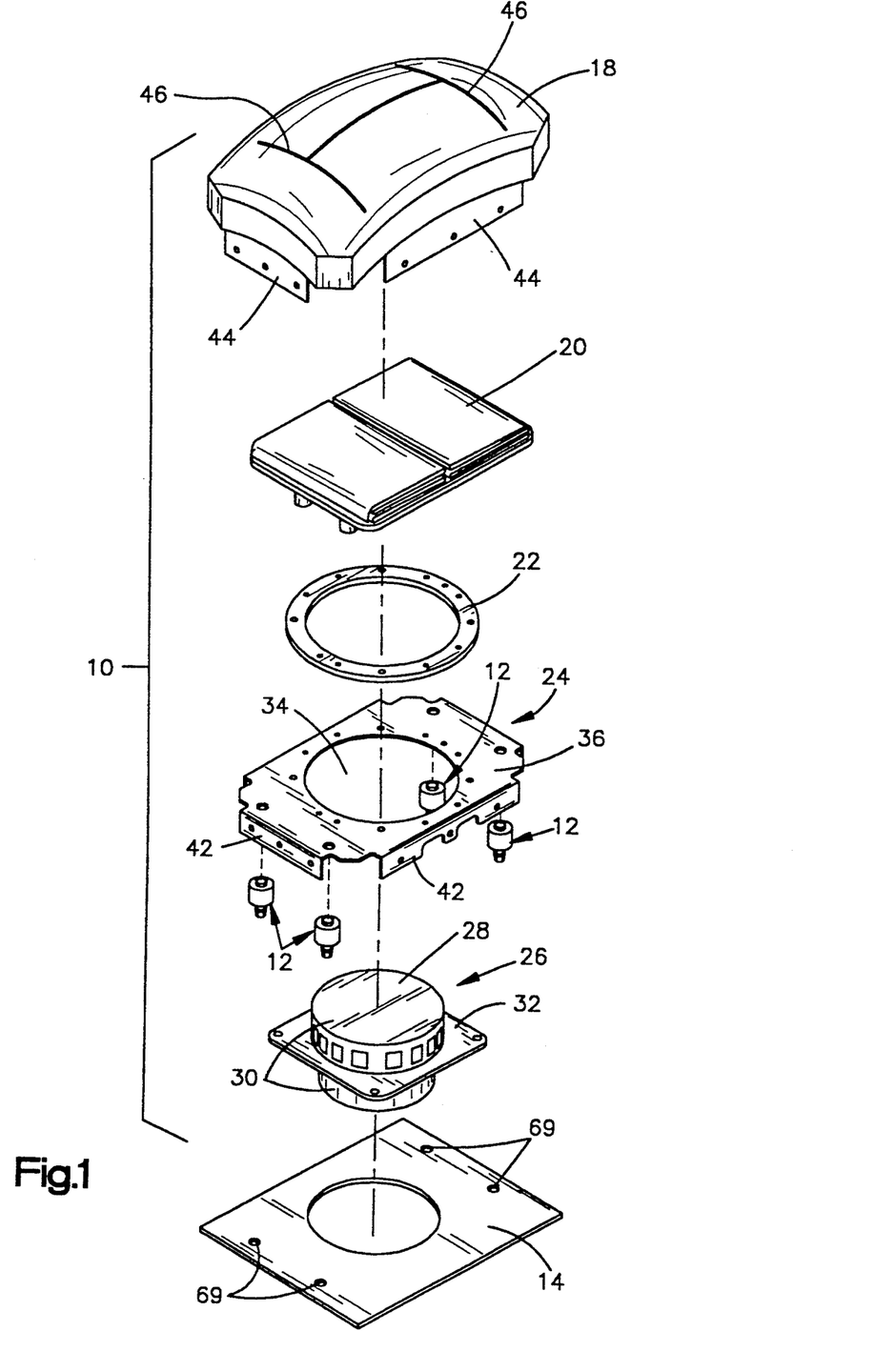
FIG. 1 is an exploded perspective view of an air bag module incorporating a series of mounting connectors in accordance with a first embodiment of the present invention.

With reference to FIGS. 1-6, an air bag module 10 incorporating mounting connectors 12 in accordance with a first embodiment of the present invention is shown. The air bag module 10 is designed to removably mount to a mounting plate 14 provided by a steering wheel 16 (FIG. 6) and includes, in addition to the mounting connectors 12, a cover member 18, an inflatable cushion 20, a cushion retainer 22, a base plate 24, and an inflator 26 (FIG. 1).

The inflator 26 includes a housing 28 and an inflator module (not shown). The inflator module is preferably of the sodium azide-type, and produces a large volume of gas to quickly inflate the cushion. As shown best in FIG. 1, the inflator housing 28 includes a pair of oppositely-directed cylindrical portions 30 and a thin outwardly extending skirt 32. The cylindrical portions 30 define a cavity for receipt of the inflator module. Conventional fasteners attach the skirt 32 to the base plate 24 while one of the cylindrical portions 30 extends through a central hole 34 in the base plate 24 and into the cushion 20, as is generally well known in the art.

The base plate 24 provides a generally planar rectangular surface 36 in which is formed the central hole 34. The cushion 20 includes a circular opening or mouth (not shown) which overlies the central hole 34 and is secured to the base plate 24 by the cushion retainer 22. More specifically, the cushion fabric adjacent the circular mouth is trapped or sandwiched between the retainer 22 and the baseplate 24, the retainer 22 and cushion 20 thereafter being riveted or otherwise permanently attached to the base plate 24.

Figure 2:
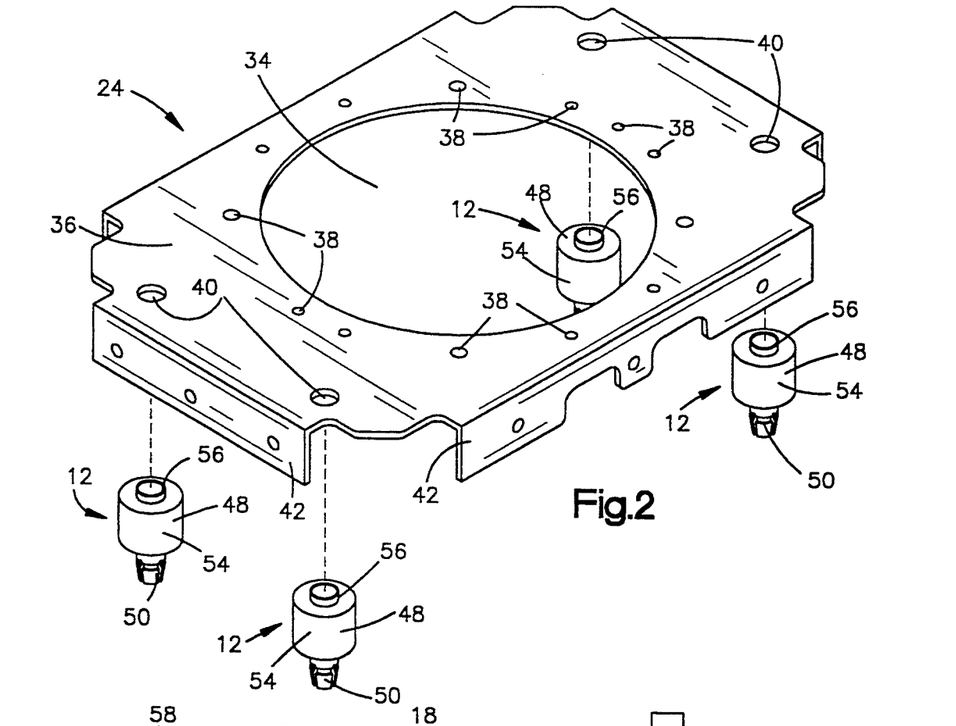
FIG. 2 is an exploded perspective view of a base plate and the mounting connectors in accordance with the first embodiment of the present invention.

Encircling the central hole 34 in the base plate is an array of relatively smaller sized mounting holes 38, as illustrated in FIGS. 1 and 2. Some of the mounting holes are provided to attach the cushion 20 and cushion retainer 22 to the base plate 24 while others of the mounting holes are provided to attach the inflator housing 28 to the base plate 24. At each corner of the rectangular surface 36 is provided an opening 40 which receives one of the mounting connectors 12.

Downwardly-directed flanges 42 extend from the four edges of the base plate 24 and attach to associated panels 44 provided by the cover member 18. The cover member 18, which defines a top surface of the module 10, is separable along a series of seams 46 to allow the inflatable cushion 20 to escape and project therethrough upon inflation. A bottom surface of the air bag module 10 is defined by the inflator housing 28 and the base plate 24.

Figures 5, 6:
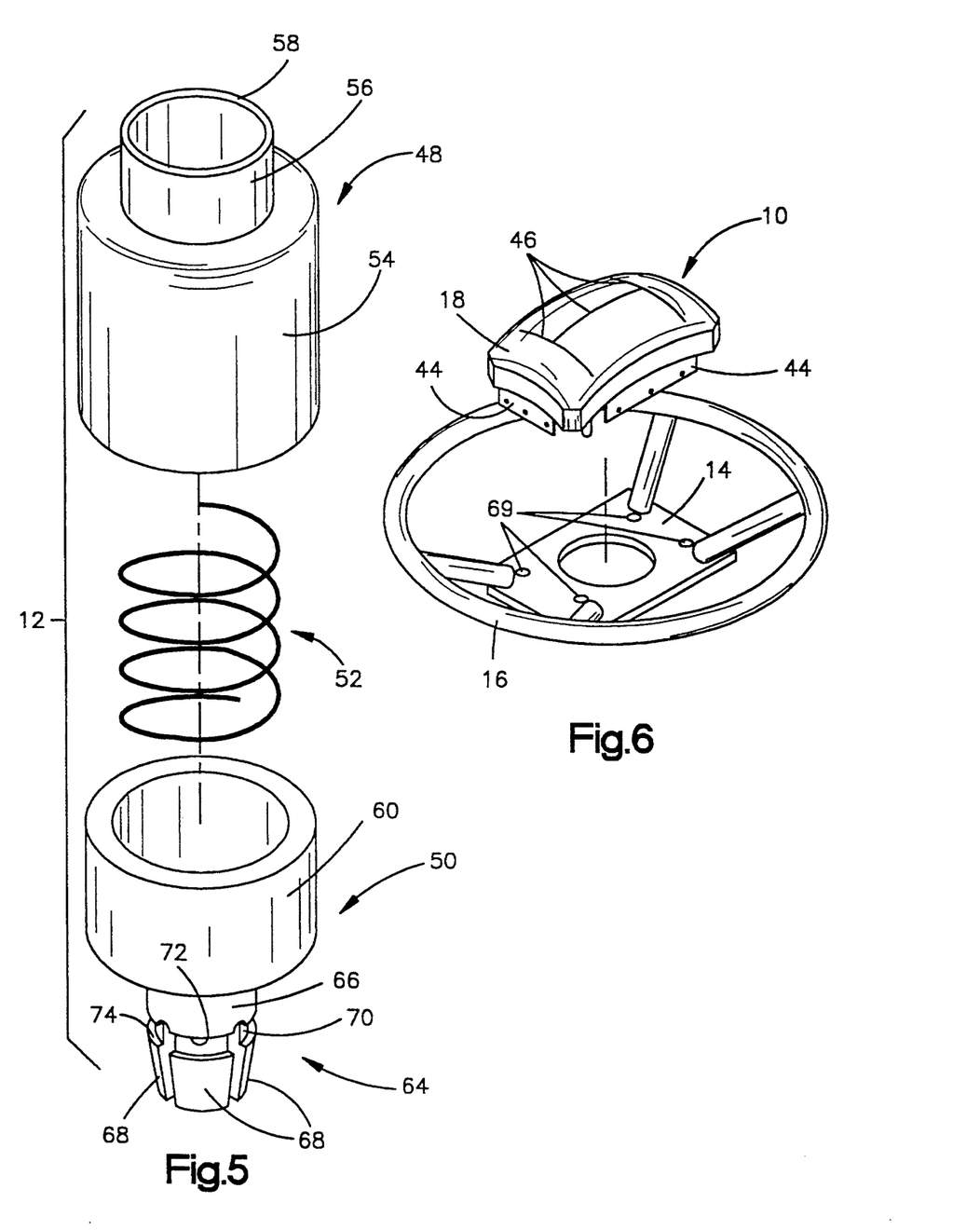
FIG. 5 is an exploded perspective view of the mounting connector according to the first embodiment of the present invention.
FIG. 6 is an exploded perspective view of the air bag module and steering wheel in accordance with the first embodiment of the present invention.

The mounting connectors 12 project downwardly from the baseplate 24 and include three component parts: an outer or first member 48, an inner or second member 50, and a coil spring 52 which biases or urges the inner member 50 relatively away from or telescopingly out of the outer member 48.

The outer member 48 serves as a main section of the mounting connector and is electrically conductive. The outer member 48 has a generally cylindrical main body portion 54 and an upstanding first end or cylindrical neck 56. The neck 56 extends through the opening 40 in the base plate 24, a terminal portion 58 of the neck 56 projecting above the base plate being radially outwardly deformed or bent over to attach the mounting connector 12 to the base plate 24, as shown best in FIGS. 3 and 4. The outer member 48 can be made of any suitable conductive material, such as cold rolled steel.

The main body portion 54 of the outer member 48 receives the coil spring 52 and a first end 60 of the inner member 50. The inner member 50 telescopingly extends from the outer member 48 under the influence of the coil spring 52, the first end 60 being maintained within the main body portion 54 of the outer member 48 by a radially in-turned second end or annular lip 62 provided by the main body portion.

The inner member 50 serves as a connecting section of the mounting connector and is electrically insulative. The inner member 50 includes, in addition to the first end 60, a second end 64 which telescopingly extends from a circular opening defined by the annular lip 62 of the outer member 48. The first end 60 of the inner member 50 is bowl-shaped, and opens toward the neck 56 of the outer member 48 and cooperates with the main body portion 54 to receive the coil spring 52. Preferably, the inner member 50 is formed of a dimensionally stable, heat and corrosion resistive material, such as 6/6 NYLON.

The second end 64 of the inner member includes a transition portion 66 and a series of spaced-apart, outwardly-extending resilient arms 68. The transition portion 66 merges with a bottom of the bowl-shaped first end 60 and is adapted and sized to extend through the circular opening in the outer member 48 defined by the annular lip 62. The resilient arms 68 project from the transition portion 66 and are inwardly deformable to allow them to be removably inserted into a hole 69 in the mounting plate 14 and thereby releasably attach the connector 12 and, hence the module 10, to the mounting plate 14.

A circumferential or annular groove 70 is provided by the second end 64 of the inner member 50 adjacent the union of the transition portion 66 and the resilient arms 68. The groove 70 is discontinuous, being interrupted by the spaces between the arms 68, and limited or bounded by upper and lower shoulder surfaces 72, 74. The groove 70 receives the mounting plate 14 and the upper and lower shoulder surfaces 72, 74 engage opposite sides of the mounting plate to attach the connectors 12 and, thus, the module 10, to the steering wheel 16. More particularly, the upper shoulder surface 72 limits insertion of the connector 12 into the hole 69, while the lower shoulder surface 74 releasably prevents removal of the connector 16 from the hole 69 in the mounting plate 14.

Assembly of the mounting connectors 12 of the first embodiment of the present invention is a relatively simple process. The coil spring 52 is inserted into the cylindrical main body portion 54 of the outer member 48, then the bowl-shaped first end 60 of the inner member 50 is inserted into the main body portion 54 such that the coil spring 52 is received by and extends into the bowl-shaped first end 60. Thereafter, a machine (not shown) forces the inner member 50 into the main body portion 54 while inwardly deforming a terminal edge of the outer member 48 to form the annular lip 62.

As so deformed, the annular lip 62 retains the inner member 50 within the outer member 48 while allowing the inner member 50 to move in a telescoping fashion relative to the outer member 48. The spring 52 biases the inner member to its outwardmost or at-rest position shown in FIG. 3 wherein the bowl-shaped portion of the inner member 50 abuts the annular lip 62 and the transition portion 66 and resilient arms 68 project from the outer member 48. Once the mounting connector 12 is assembled, it is attached to the base plate 24 by inserting the neck 56 of the outer member through one of the openings 40 in the base plate, and radially outwardly deforming the terminal portion 58 of the neck 56.

With the mounting connectors 12 attached to the base plate 24, the cushion 20 and cushion retainer 22 are attached, by rivets or the like, to the base plate 24, as discussed hereinbefore. Thereafter, the panels 44 of the cover member 18 are attached to the flanges 42 of the base plate 24 to complete assembly of the module.

With the module 10 so assembled, and the mounting connectors 12 projecting downwardly from the base plate 24, the air bag module 10 can be snap-fittingly mounted to the steering wheel 16. The resilient arms 68 of the inner member 50 are aligned with the holes 69 provided by the mounting plate 14, and pushed toward the mounting plate 14. The arms 68 are cammed or deformed radially inwardly as they pass through the holes 69. Once through the holes 69, the arms 68 snap outwardly, receiving the mounting plate 14 within the annular groove 70 (i.e., between the shoulder surfaces 72, 74) and generally preventing further movement of the inner member 50 relative to the mounting plate 14.

Figure 3:
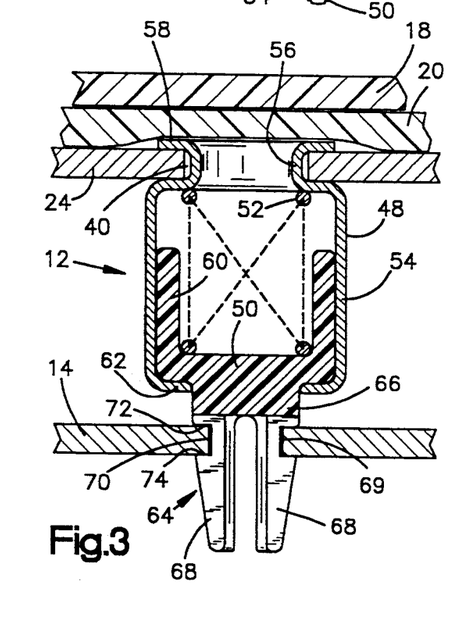
FIG. 3 is an elevational view, in cross section, of the mounting connector, base plate, and a mounting plate in a normal or at-rest condition in accordance with the first embodiment of the present invention.
Figure 4:
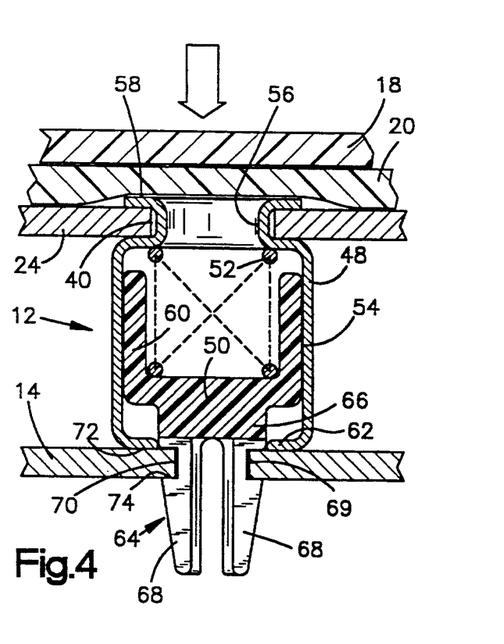
FIG. 4 is an elevational view, in cross section, of the mounting connector, base plate, and mounting plate in an inward or horn actuating position, in accordance with the first embodiment of the present invention.

With reference to FIGS. 3 and 4, the operation of the mounting connectors 12 of the first embodiment as a portion of the horn actuator mechanism is shown. The mounting connectors 12 space the base plate 24 from the mounting plate 14, and provide a contact for a horn actuation switch. More specifically, the bias of the coil spring 52 maintains the outer member 48 of the mounting connector 12 a distance from the mounting plate 14, while the mounting plate 14 serves as the first contact of the horn actuation switch and the outer member's annular lip 62 serves as the second horn switch contact.

The annular lip 62 is usually maintained a short distance from the mounting plate 14 due to the bias of the coil spring 52 (FIG. 3), as discussed previously. When sufficient force is exerted upon the cover member 18 to overcome the spring bias, the entire module 10, with the exception of the inner member 50 of the mounting connector 12, moves toward the mounting plate 14. The movement of the module 10 is limited by engagement of the annular lip 62 with the mounting plate 14, which closes the horn actuation switch (FIG. 4) and sounds the horn. Placement of the mounting connectors 12 at the four corners of the module 10 securely attaches the module 10 to the mounting plate 14, while assuring that inwardly directed pressure at any location on the cover member 18 will actuate the horn.

The module 10 is disengaged or unattached from the mounting plate by radially inwardly deforming the resilient arms 68 to free the lower shoulder surfaces 74 from engagement with the mounting plate 14. A tool (not shown) can be provided to simultaneously disengage all of the mounting connectors 12 from the mounting plate 14. Thereafter, the module 10 is simply pulled away from the mounting plate 14 to complete removal of the module from the steering wheel 16.

Figure 7:
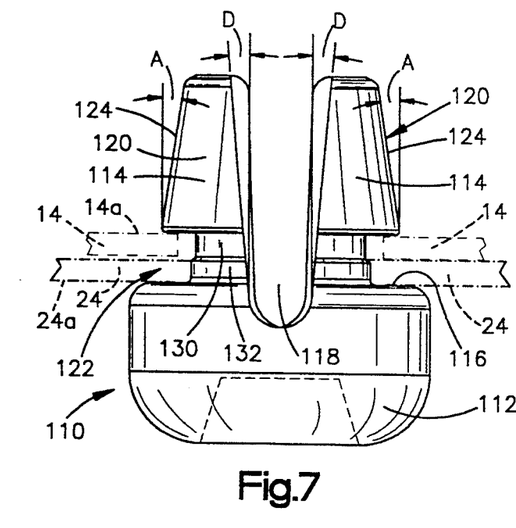
FIG. 7 is a front elevational view of the mounting connector in accordance with a second embodiment of the present invention, with a mounting plate and base plate shown in phantom.
Figure 8:
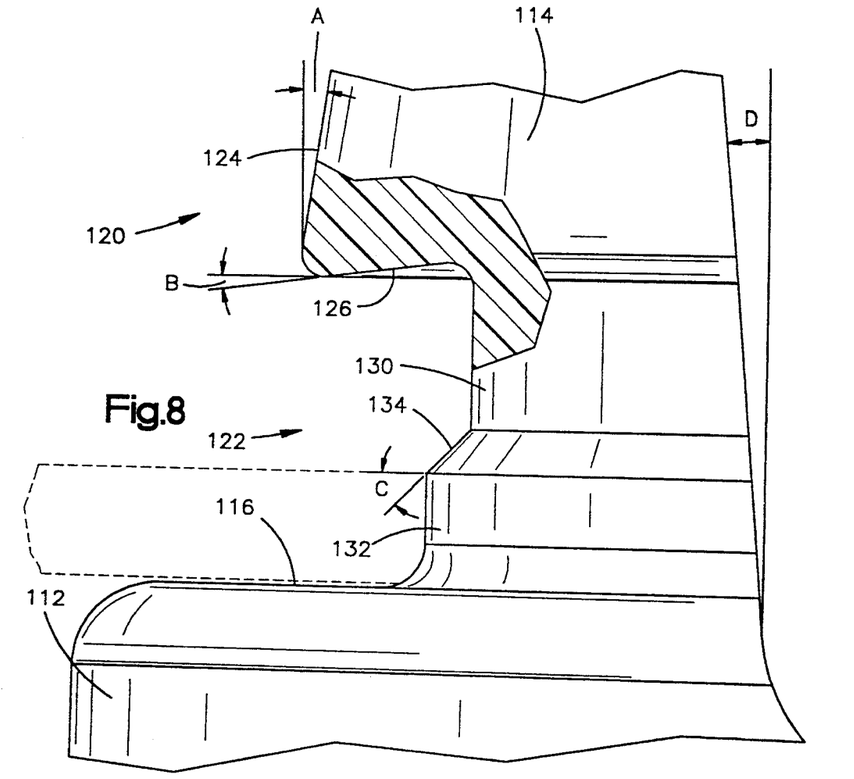
FIG. 8 is an enlarged elevational view, partly in cross section, of a portion of the mounting connector in accordance with the second embodiment of the present invention; and, FIG. 9 is a top plan view of the mounting connector illustrated in FIG. 7.
Figure 9:
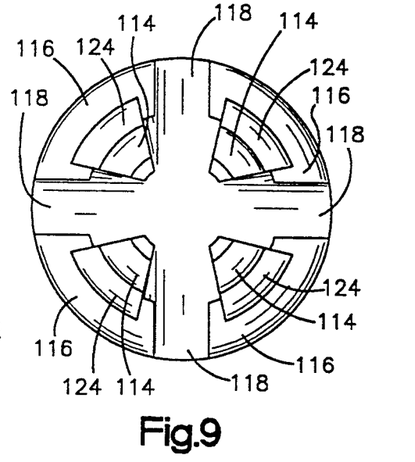

With reference to FIGS. 7-9, a mounting connector 110 in accordance with a second embodiment of the present invention is illustrated. The mounting connector 110, which is preferably formed of reinforced nylon, is adapted to rigidly mount a base plate 24 of an air bag module assembly 10 to a mounting plate 14. The air bag module assembly 10 and mounting plate 14 are generally identical to those illustrated in FIGS. 1-6, with the exception of the present embodiment of the mounting connector 110 and any modifications to the plates 14, 24 necessary to allow the base plate 24 and mounting plate 14 to engage in a face-to-face manner, and will therefore not be further discussed hereinafter.

The mounting connector 110 includes an enlarged head 112 and a series of resiliently deformable arms 114. The head 112, which includes a hollow or bowl-shaped lower end, provides a generally planar shoulder surface 116 from which the arms 114 project. The shoulder surface 116 acts as a stop to limit insertion of the mounting connector 110 into the base plate 24 and engages an inner surface 24a of the base plate. The arms 114, which are spaced-apart by notches or slots 118, include a distal retaining portion 120 and a proximal mounting portion 122.

As illustrated best in FIG. 8, the retaining portion 120 of each arm 114 includes an outer camming surface 124 and an engaging surface 126. The camming surface 124 is adapted to slidably engage the base plate 24 and the mounting plate 14, causing the arms 114 to deform radially inward, and allowing insertion of the mounting connector 110 into the plates 14, 24. The camming surface 124 forms an angle A with respect to vertical and, preferably, the angle A is equal to about 8°. The engaging surface 126 is adapted to engage an outer surface 14a of the mounting plate 14 and releasably prevent removal of the mounting connector 110 therefrom. The engaging surface 126 is curved and ramps upwardly as it moves radially inward, and forms an angle B with respect to the shoulder surface 116. The angle B is preferably equal to about 5°.

The mounting portion 122 of each arm 114 includes upper and lower co-axial cylindrical surfaces 130, 132. The upper cylindrical surface 130 merges with the engaging surface 126 and is slightly smaller in diameter than the lower cylindrical surface 132. The lower cylindrical surface 132 merges with the shoulder surface 116 of the enlarged head 112. The upper and lower cylindrical surfaces 130, 132 are interconnected by an arcuate ramping or camming surface 134 which provides a gradual transition from the smaller diameter upper cylindrical surface 130 to the larger diameter lower cylindrical surface 132. The ramping surface 134 preferably forms an angle C of about 45° with respect to the plane defined by the shoulder surface 116.

The notches 118 separating the arms 114 result in discontinuity in the cylindrical surfaces 130, 132, the ramping surface 134, and the shoulder surface 116. The notches 118 extend into the enlarged head 112 a short distance to help promote elastic bending of the arms 114. Preferably, the notches 118 make an angle D with respect to a vertical axis and, most preferably, the angle D is equal to about 5°.

Installation and use of the mounting connector 110 according to the second embodiment of the present invention will hereafter be described with reference to the foregoing description and drawings.

Prior to assembly of the air bag module 10, the retaining portion 120 of the mounting connector 110 is aligned with a mounting hole 40 provided by the base plate 24. Pushing force on the enlarged head 112 moves the retaining portion 120 of the arms 114 through the hole 40, causing the camming surface 124 to engage the base plate 24 and force the arms 114 to resiliently deform radially inward. Once the retaining portions 120 of the arms 114 pass through the hole 40, the arms 114 snap radially outwardly to their original or at-rest position.

Further pushing force on the enlarged head 112 causes the upper cylindrical surface 130 and the camming surface 134 to pass through the hole 40. Thereafter, the edges of the base plate 24 surrounding the hole 40 engage the lower cylindrical surface 132. The diameter of the lower cylindrical surface 132 is preferably sized to closely match the diameter of the hole 40 in the base plate 24 to provide an interference fit between the lower cylindrical surface 132 and the base plate 24. The edges of the base plate 24 surrounding the holes 40 may be serrated, grooved, threaded, or otherwise shaped to enhance frictional contact between the connector 110 and the base plate 24. The interference or press-fit between the mounting connectors 110 and the base plate 24 is the only means required to attach the connector 110 to the base plate 24. Preferably, once inserted in the hole 40, the mounting connector 110 will be capable of resisting at least 45N of outwardly-directed force (i.e., force tending to move the mounting connector 110 out of the base plate 24). This resistance to outward force is necessary because when the module 10 is attached to the mounting plate 14 there is a force tending to push the connectors 110 out of the holes 40, as will be described more fully hereafter.

Depending upon the tolerances maintained during manufacture of the base plate 24 and the mounting connector 110, a portion of the camming surface 134 adjacent the lower cylindrical surface 132 may be deformed due to contact with the base plate 24, especially if the edges surrounding the holes 40 are not smooth. The camming surface 134 also acts to center the connector 110 within the hole 40, which eases and speeds assembly. Once the connectors 110 are attached to the base plate 24, the remainder of the module 10 is assembled as described in the foregoing first embodiment.

The module 10 is attached to the mounting plate 14 by aligning the connectors 110 with the holes 69 in the mounting plate and pushing the module toward the mounting plate 14. The camming surfaces 124 of the retaining portions 120 slidably engage the mounting plate 14 adjacent the holes 69, resiliently deforming the arms 114 and allowing the retaining portion 120 to pass through the holes 69. Once the retaining portions 120 pass through the holes 69, the arms 114 resiliently snap radially outward to their at-rest or normal position. When the arms 114 are being pushed through the holes 69, a force is created which tends to push the connectors 110 away from the base plate 24. This force is counteracted by the interference fit between the connectors 110 and the base plate 24.

The engaging surface 126 contacts a top surface 14a of the mounting plate 14. Forming the engaging surface 126 at an angle relative to the plane defined by the shoulder surface 116 allows the retaining portion to compensate for manufacturing tolerances in the mounting plate 14 and base plate 24 thicknesses. For example, if the mounting plate 14 is slightly thicker than illustrated, the retaining portion 120 will rotate slightly inwardly, the angle B will be slightly less, and the engaging surface 126 will remain in contact with the top surface 14a of the mounting plate 14.

The angle B of the engaging surface 126 therefore compensates for manufacturing tolerances while rigidly attaching the connector 110 to the mounting plate 14. Tolerance compensation provided hereby ensures that the module 10 will not vibrate due to a loose fit between the connector 110 and the mounting plate 14.

The mounting connectors 110 firmly yet removably attach the module 10 to the mounting plate 14. The retaining portion 120 ensures that the module 10 will not be inadvertently or accidentally unattached from the mounting plate 14. Preferably, the retaining portions 120 of the arms have a high tension strength, each connector 110 being capable of withstanding at least about 7500N pulling force.

The module 10 is disengaged or unattached from the mounting plate 14 by radially inwardly deforming the resilient arms 114 to free the engaging surfaces 126 from engagement with the outer surface 14a of the mounting plate 14. A tool (not shown) can be provided to simultaneously disengage all of the mounting connectors 110 from the mounting plate 14. Thereafter, the module 10 is simply pulled away from the mounting plate 14 to complete removal of the module from the mounting plate 114.

While the preferred embodiments of the present invention are shown and described herein, it is to be understood that the same is not so limited but shall cover and include any and all modifications thereof which fall within the purview of the present invention as defined by the claims appended hereto. For example, the term mounting plate as used herein is intended to refer to any support structure to which the air bag module is attached. Also, although the mounting connectors according to the first embodiment are described as being associated with a steering wheel, it should be clear that these connectors can be employed to attach the air bag module to any structure, such as a dashboard, head rest, or seat back.

What is claimed is:

1. An air bag module comprising a base plate and a series of connectors for removably attaching the module to a mounting plate, said connectors comprising an outer member connected to the base plate, an inner member which telescopingly projects from the outer member and releasably connects the module to the mounting plate, and means for biasing the inner member away from the outer member, said outer member being electrically conductive and including a first end which is attached to the base plate and a second end which retains a portion of the inner member within the outer member, said second end cooperating with the mounting plate to define a horn switch, said inner member being electrically insulative and including a series of resiliently deformable arms, said arms cooperating to define an annular groove for the receipt of the mounting plate, said biasing means being intermediate the inner and outer members, said connectors allowing the module to move toward the mounting plate while connected thereto and allowing the module to be disconnected and removed from the mounting plate.

2. An air bag module according to claim 1, wherein the annular groove is discontinuous and is limited by upper and lower shoulder surfaces, said upper shoulder surface limiting insertion of the connector into the mounting plate while the lower shoulder surface releasably prevents removal of the connector from the mounting plate.

3. An air bag module according to claim 1, wherein the biasing means comprises a coil spring which is trapped between the inner and outer members.

4. An air bag module according to claim 1, wherein the second end of the outer member defines an annular lip, said lip retaining the inner member within the outer member.

5. An air bag module according to claim 4, wherein a portion of the inner member projects through a circular opening in the outer member defined by the annular lip.

6. An air bag module according to claim 5, wherein the portion of the inner member includes the resiliently deformable arms, said arms cooperating to provide means for releasably capturing and retaining the mounting plate.

7. An air bag module according to claim 6, wherein the capturing means comprises the annular groove, said groove being bounded by upper and lower shoulder surfaces which contact opposite sides of the mounting plate.

8. An air bag module according to claim 7, wherein the annular groove is discontinuous, said upper shoulder surface limiting insertion of the connector into the mounting plate while the lower shoulder surface releasably prevents removal of the connector from the mounting plate.

9. An air bag module comprising a base plate and a series of connectors for removably attaching the module to a mounting plate, said connectors comprising an outer member connected to the base plate, an inner member which telescopingly projects from the outer member and releasably connects the module to the mounting plate, and means for biasing the inner member away from the outer member, said outer member having an end which defines an annular lip, said lip retaining the inner member within the outer member, said inner member having an end which projects through a circular opening in the outer member defined by the annular lip, said inner member end including a series of resiliently deformable arms which cooperate to provide means for releasably capturing and retaining the mounting plate, said biasing means being intermediate the inner and outer members, said connectors allowing the module to move toward the mounting plate while connected thereto and allowing the module to be disconnected and removed from the mounting plate.

10. An air bag module according to claim 9, wherein the capturing means comprises a circumferential groove, said groove being bounded by upper and lower shoulder surfaces which contact opposite sides of the mounting plate.

11. A steering wheel comprising an air bag module assembly and a mounting plate, the mounting plate defining a first horn switch contact and the assembly comprising a cover member, an inflator operable to inflate a cushion, a base plate, means for attaching the inflatable cushion to the base plate, and a series of mounting connectors, said cover member overlying the inflatable cushion and the base plate and being separable upon inflation of the cushion to allow the cushion to project outwardly, the inflator extending through the base plate and into the cushion, the improvement comprising:

said mounting connectors removably attaching the module assembly to the mounting plate, said mounting connectors having an electrically conductive main section attached to the base plate which defines a second horn switch contact, an electrically insulative connecting section which telescopingly extends from the main section and includes a series of resilient arms which are snap-fittingly received by the mounting plate, and means for biasing the connecting section away from the main section, wherein user-applied force on the cover member overcomes the biasing force and causes the main section to move toward the mounting plate until the main section engages the mounting plate, thereby closing the horn switch and activating the horn.

12. A steering wheel according to claim 11, wherein the main section comprises a generally cylindrically-shaped body with a smaller diameter neck portion extending therefrom, said neck portion being deformably connected to the base plate.

13. A steering wheel according to claim 11, wherein the resilient arms are spaced-apart from one another and adapted to be radially compressed to disconnect the module from the mounting plate.

14. A steering wheel according to claim 13, wherein the arms include a discontinuous circular groove into which fits the mounting plate.

15. A steering wheel according to claim 14, wherein the groove is bounded by upper and lower shoulder surfaces, said upper shoulder surface limiting insertion of the connector into the mounting plate while the lower shoulder surface releasably prevents removal of the connector from the mounting plate.

16. A steering wheel according to claim 11, wherein the main section includes an annular lip which retains at least a portion of the connecting section within a hollow interior area of the main section.

17. A steering wheel according to claim 16, wherein the biasing means comprises a coil spring which is trapped within the hollow interior of the main section between an inner surface of the main section and the connecting section.

* * * * *